United States Patent [19]

En

[11] 3,873,971

[45] Mar. 25, 1975

[54] RANDOM ERROR CORRECTING SYSTEM

[75] Inventor: John En, Palatine, Ill.

[73] Assignee: Motorola, Inc., Chicago, Ill.

[22] Filed: Oct. 31, 1973

[21] Appl. No.: 411,552

[52] U.S. Cl. .......................................... 340/146.1 AQ
[51] Int. Cl. .............................................. G06f 11/12
[58] Field of Search ............................ 340/146.1 AQ

[56] References Cited

UNITED STATES PATENTS

| | | | |
|---|---|---|---|
| 3,469,236 | 9/1969 | Gallager | 340/146.1 AQ |
| 3,571,795 | 3/1971 | Tong | 340/146.1 AQ |
| 3,605,090 | 9/1971 | Burton | 340/146.1 AQ |
| 3,728,678 | 4/1973 | Tong | 340/146.1 AQ |

OTHER PUBLICATIONS

Peterson & Weldon, Error Correcting Codes, 2nd Edition, MIT Press, 1972, TK 5102.5 P4, p. 392–426. pp.

*Primary Examiner*—Charles E. Atkinson
*Attorney, Agent, or Firm*—Eugene A. Parsons; Vincent J. Rauner

[57] ABSTRACT

A rate one half random error correcting convolutional coding system capable of correctng two out of any twelve information and parity bits having an encoder comprising a six stage shift register and a modulo 2 adder connected to the shift register for combining the first, fourth, fifth and sixth information bits present in the register to generate parity bits which are subsequently interleaved with the information bits. A decoder employing another six stage shift register generates syndrom bits by combining parity bits generated from the received information with the received parity bits. The syndrome bits are applied to a six stage syndrome register which is coupled, both directly and via other modulo 2 adder, to a majority logic circuit which provides a correcting signal when the number of ones applied thereto exceeds a predetermined number.

14 Claims, 3 Drawing Figures

(1) $P_i = I \oplus I_{i-1} \oplus I_{i-2} \oplus I_{i-5}$ (2) $S_i = P'_i \oplus I'_i \oplus I'_{i-1} \oplus I'_{i-2} \oplus I'_{i-5}$ (3) $S_1 = P'_1 \oplus I'_1$ (4) $S_2 = P'_2 \oplus I'_2 \oplus I'_1$ (5) $S_3 = P'_3 \oplus I'_3 \oplus I'_2 \oplus I'_1$ (6) $S_4 = P'_4 \oplus I'_4 \oplus I'_3 \oplus I'_2$ (7) $S_5 = P'_5 \oplus I'_5 \oplus I'_4 \oplus I'_3$ (8) $S_6 = P'_6 \oplus I'_6 \oplus I'_5 \oplus I'_4 \oplus I'_1$ (9) $S_3 + S_4 = P'_3 \oplus P'_4 \oplus I'_4 \oplus I'_1$

(10) $S_5 + S_6 = P'_5 \oplus P'_6 \oplus I'_6 \oplus I'_3 \oplus I'_1$

FIG. 3

RANDOM ERROR CORRECTING SYSTEM

BACKGROUND FIELD OF INVENTION

This invention relates generally to digital information transfer systems, and more particularly to error correcting digital transmission systems which transmit redundant information in the form of parity bits to provide the necessary information for correcting errors which occur during transmission at the receiving end of the system.

PRIOR ART

A number of redundant error correcting systems have employed the parity check digit concept wherein a parity digit is added to a group of binary information digits to make the sum of the information and parity digits always odd (or even) in accordance with a predetermined condition. One such system is commonly known as a Hagelbarger code which described in U.S. Pat. No. 3,227,999 to David W. Hagelbarger, issued Jan. 4, 1966.

Whereas this system provides a way to correct transmission errors in a digital system, the system can only correct a predetermined number of errors in each predetermined group of digits. For example, the Hagelbarger system can correct only two out of every seventeen digits transmitted.

SUMMARY

Accordingly, it is an object of the present invention to provide a more effective error correction system.

Another object of the invention is to provide, easily implemented, error correction system that has an increased error correction capability.

More specifically, it is an object of this invention to provide a system capable of correcting two errors out of every group of 12 information digits transmitted.

In accordance with a preferred embodiment of the invention, information digits are applied in sequence to a six stage shift register. The first, second, third and sixth stages of the shift register are coupled to a modulo 2 adder which combines the first, fourth, fifth and sixth bits of each six bit group of information digits applied to the register. A switch connected to the shift register and the modulo 2 adder alternately applies the information bits and parity bits generated by the modulo 2 addition to a recording medium or to a transmission channel such as a telephone line or a radio link.

The receiving end of the error correction system according to the invention employs a decoder circuit utilizing a six stage shift register and modulo 2 adder similar to that used in the encoder. The received information bits are applied to the six stage shift register-modulo 2 adder combination to generate a locally generated parity bit which is modulo 2 combined with a received parity bit to provide a syndrome bit. The syndrome bits are applied to a second six stage shift register having a first modulo 2 adder connected to the first and second stages thereof and a second modulo 2 adder connected to the third and fourth stages thereof. A majority logic circuit is connected to the outputs of the first and second modulo 2 adders and to the fifth and sixth stages of the syndrome shift register. If the number of ones applied to the majority logic circuit is less than two, no correction is made, however, if the number of ones is greater than two, a correction signal is generated to reverse the polarity of the information bit emerging from the last stage of the information shift register and to further correct the bits in the first, fourth and fifth stages of the syndrome register to correct the syndrome bits present therein to assure proper correction of subsequent errors.

DESCRIPTION OF THE DRAWINGS

FIG. 3 is a table of equations describing the encoding and decoding processes, and is included to illustrate the operation of the system according to the invention.

DETAILED DESCRIPTION

Figure 1:
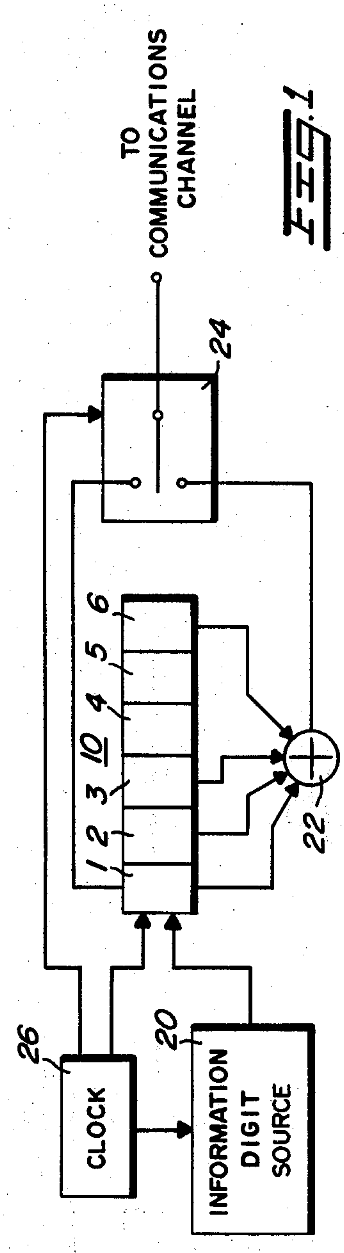
FIG. 1 is a block diagram of an embodiment of an encoder for the error correcting system according to the invention.

Referring to FIG. 1, there is shown an embodiment of the coding system according to the invention. A six stage sample and storage means such as shift register 10 having stages 1-6 has an input thereof connected to a source of information digits 20. The stages 1, 2, 3 and 6 of the shift register 10 are connected to a modulo 2 adder 22. A modulo 2 adder is a non-carrying adder having the characteristic such that if only zeros or an even number of ones are applied thereto, the output thereof will be a zero. If an odd number of ones are applied thereto, the output thereof will be a one.

A double throw switch 24 is connected to stage 1 of the shift register 10 and to the output of the modulo 2 adder 22. A clock 26 is connected to the information digit source 20, the shift register 10 and the switch 24.

In operation, the encoder generates parity bits, or check digits, from the information from the source 20 and interleaves the parity bits with the information bits. The generation of the parity bits is as follows. Information bits from the source 20 are applied to the first stage (stage 1) of the shift register 10. The stages 1, 2, 3 and 6 of the shift register 10 are sampled, and the modulo 2 sum of the contents of the sampled stages is applied to the switch 24, as in the contents of the first stage. After each new information bit is applied to stage 1 of the shift register 10, the contents of each stage is shifted to the adjacent stage having a higher numerical designation, and the modulo 2 sum of the new contents of the stages 1, 2, 3 and 6 is taken and applied to the switch 24 along with the new contents of the stage 1. The clock 26 provides pulses to synchronize the digit source, 20, to advance the information through the shift register 10, and to cause the switch 24 to alternately apply the contents of stage 1 and the output of the modulo 2 adder 22 to the communications channel. The output of the switch 24 is a signal comprising an information bit followed by a parity bit, the information bit-parity bit sequence continuing for the duration of the message from the source 20.

Figure 2:
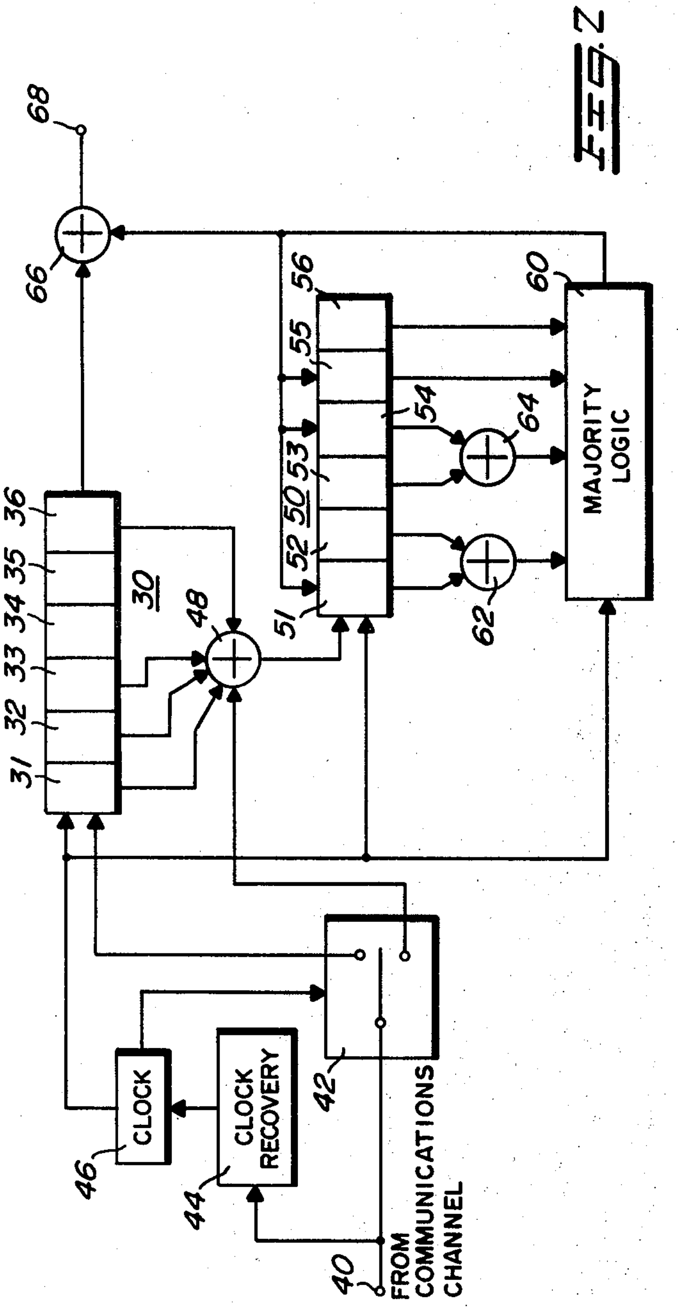
FIG. 2 is a block diagram of a decoder for decoding signals of the type generated by the encoder of FIG. 1.

Referring to FIG. 2, a decoder for the encoded signal generated by the circuit of FIG. 1 comprises a six stage sample and storage means such as a shift register 30 having stages 31-36. The input of the shift register 30 is connected to the communications channel via an input point 40 and a double throw switch 42. A clock recovery circuit 44, which drives a clock 46, is also connected to the input point 40. Outputs of the clock 46 are connected to the double throw switch 42, the shift register 30, a shift register 50 and a majority logic circuit 60.

The stages 31, 32, 33 and 36 of shift register 30, which correspond to the similar stages 1, 2, 3 and 6 of shift register 10 in FIG. 1, are connected to inputs of a modulo 2 adder 48 which has another input connected to the double throw switch 42. The output of the modulo 2 adder 48 is connected to the first stage of another sample and storage means, in this embodiment a syndrome shift register 50 having stages 51–56. The stages 51 and 52 are connected to the input of a modulo 2 adder 62, and the stages 53 and 54 are connected to a modulo 2 adder 64. The majority logic circuit has four inputs, two of the inputs being connected to the outputs of the modulo 2 adders 62 and 64, and the other input being connected to the stages 55 and 56 of shift register 50. An output of the majority logic circuit 60 is connected to the stages 51, 54 and 55 of the shift register 50 and to a modulo 2 adder 66. The modulo 2 adder has a second input connected to the stage 36 of the shift register 30 and an output connected to an output point 68.

The operation of the decoding circuit of FIG. 2 is as follows. The encoded signal from the communications channel is applied to the input point 40. The clock recovery circuit 44 synchronizes the clock 46 to the data from the communications channel and causes the clock to operate the switch 42, the shift registers 30 and 50, and the majority logic circuit 60 to operate in proper synchronism. The operation of the switch 42 is synchronized to the operation of the switch 24 of FIG. 1 to cause information bits applied to the input point 40 to be routed to the shift register 30, and the parity bits to be applied to the modulo 2 adder 48. The contents of the stages 31, 32, 33 and 36 of the shift register 30 are sampled by the modulo 2 adder 48 to generate a locally generated parity bit from the received information applied to the register 30. The locally generated parity bit is modulo 2 added with the corresponding parity bit received from the communications channel via the switch 42 to provide a syndrome bit. If no errors have occurred during the transmission, the locally generated parity bit will be the same as the parity bit received from the communications channel and the modulo 2 sum of the locally generated and received parity bits will be equal to zero to provide a syndrome bit having a value of zero. Should an odd number of bits present in the stages 31, 32, 33 and 36, or the received parity bit be in error, the resultant syndrome bit would have a value of one.

Each time a new information bit is received from the communications channel, the new information bit is applied to the stage 31 of the shift register 30, and the older bits present in the shift register 30 are shifted to the adjacent stages having the next higher numerical designation. The old bit present in the stage 36 is shifted out. Similarly, each time a new information bit is applied to the shift register 30, a new syndrome bit is generated by the modulo 2 adder 48 and applied to the stage 51 of the syndrome register 50.

Each time a new syndrome bit is applied to the syndrome register 50, the modulo 2 adder 62 takes the modulo 2 sum of the bits in stages 51 and 52 and applies the result to the majority logic circuit 60. In a similar fashion, the modulo 2 adder 64 takes the modulo 2 sum of the contents of the stages 53 and 54 and applies the result to the majority logic circuit 60. The contents of the stages 55 and 56 are applied directly to the majority logic circuit 60. The majority logic circuit 60 counts the number of ones applied thereto and provides a correction signal, which is ordinarily a one, to the modulo 2 adder 66 if the number of ones applied to the majority logic circuit is greater than 2. The correction signal, which is applied to the modulo 2 adder 66, causes the polarity of the bit from the stage 36 to be reversed (e.g., changed from a 1 to a 0, or a 0 to a 1) before being applied to the output point 68, the circuit having indicated that the bit in the stage 36 was in error.

Due to the operation of the circuit, the values of the bits in stages 51, 54 and 55 of the shift register 30 have been determined, in part, by the value of the erroneous bit 36. Accordingly, the error signal is also applied to the last mentioned stages to cause a reversal of polarity of the bits therein to correct the bits to thereby provide corrected syndrome bits for correcting subsequently received information bits.

In order to better understand the operation of the system according to the invention, it is appropriate to, at this point, discuss the basic theory of operation of the system. Referring to FIG. 3, Equation (1) represents the parity bit generation performed by the encoding system of FIG. 1. In Equation (1), P represents a parity bit, I represents an information bits,⊕ represents a modulo 2 sum and the subscript *i* represents a particular parity or information bit in the sequence. The Equation (1) defines which of the stages of the shift register 10 are to be tapped. The Equation (1) states that the parity bit is equal to the modulo 2 sum of the current information bit, the two previous information bits and the fifth preceding information bit. Consequently, the stages 1, 2, 3 and 6 of the shift register 10, which contain the current, the two previous and the fifth preceding information bits, respectively, are tapped and connected to the modulo 2 adder 22.

The Equation (2) is a mathematical representation of the syndrome bit generating system of the decoder of FIG. 2. In Equation (2), S represents a syndrome bit, and P′ and I′ represent received parity and information bits, respectively. As in the Equation (1), the subscript *i* represents a particular bit of the sequence. The primed characters represent received facsimiles of the bits transmitted by the coding system of FIG. 1. For example, $I'_i$ is a received representation of the bit $I_i$, and in the absence of a transmission error, $I'_i$ is equal to $I_i$. Should a transmission error occur as a result of noise or other disturbance, the value of $I'_i$ may be different from that of $I_i$. Similarly, $P'_i$ may or may not be equal to $P_i$, depending on the quality of the communications channel.

Referring to Equation (2), it can be seen that the current syndrome bit $S_i$ is equal to the modulo 2 sum of the current received parity bit $P'_i$, the current received information bit $I'_i$, the two preceding received information bits $I'_{i-1}$ and $I'_{i-2}$, and the fifth preceding received information bit $I'_{i-5}$. The aforementioned relationship of Equation (2) is also evident in the structure of FIG. 2 wherein the modulo 2 adder 48 receives current and preceding information bits from the shift register 30 and current parity bits from the switch 42.

If we assume that there has been no error in the transmission of any of the information bits shown in Equation (2), then each received information bit shown in FIG. 2 is equal to a respective information bit shown in Equation (1). This being the case, Equation (1) may be substituted into Equation (2), i.e., the last four terms of Equation (2) being replaced by the term $P_i$, thus making $S_i$ equal to the modulo 2 sum of $P'_i$ and $P_i$. If we further assume that there has been no transmission error in the transmission of the received parity bit $P'_i$, then $P'_i$ is equal to $P_i$. Since, according to the definition of a modulo 2 sum, the modulo 2 sum of either two zeros or two ones is equal to zero, $S_i$ will be zero when no transmission errors have occurred. Hence, if no transmission errors have occurred in the transmission of the current parity bit or the current information bit, and if the information bits present in the tapped stages of the shift register 30 of FIG. 2 are correct, the syndrome bit applied to the shift register 50 by the modulo 2 adder 48 will be a zero.

To further illustrate the operation of the system according to the invention, the general syndrome generating Equation (2) will be particularized to show how the first six syndrome bits of a message are generated. For purposes of clarity, we shall assume that all of the stages of the shift registers 30 and 50 of FIG. 2 have been set to zero prior to the initiation of the message, however, the following analysis is also applicable if previous bits of the message are present in the shift registers.

Referring to Equation (3), the first syndrome bit $S_1$ is equal to the modulo 2 sum of the first received parity bit $P'_1$ and the first received information bit $I'_1$. The Equation (3) is obtained by substituting a 1 for the i in Equation (2). Since all bits preceding the first bit have been defined as zero for purposes of clarity, the last three terms of Equation (2) are equal to zero and may be dropped. Equations (4) through (8) are obtained in a similar fashion by substituting 2 through 6, respectively, into Equation (2). Since it was previously determined that, in the general Equation (2), $S_i$ has a value of zero when no transmission errors have occurred, and since the Equations (3)–(8) are specific instances of the general Equation (2), the syndrome bits $S_1$ through $S_6$ are equal to zero if no transmission errors have occurred in any of the received information bits $I'_1$ through $I'_6$ or in the received parity bits $P'_1$ through $P'_6$.

The syndrome bits $S_1$–$S_6$ from the modulo 2 adder 48 are sequentially applied to the shift register 50 such that after all 6 bits have been generated, the stages 51–56 contain the syndrome bits $S_6$–$S_1$, respectively. The modulo 2 adder 62 combines the syndrome bits $S_6$ and $S_5$ present in stages 51 and 52, while the modulo 2 adder 64 combines the syndrome bits $S_4$ and $S_3$ present in the stages 53 and 54, respectively. The modulo 2 addition performed by the adders 64 and 62 is represented by the Equations (9) and (10) of FIG. 3. The Equation (9) is obtained by modulo 2 adding the Equations (5) and (6). Since the terms $I'_2$ and $I'_3$ are each present in both Equations (5) and (6), the modulo 2 sum thereof is equal to zero and only the remaining terms shown in Equation (9) need be retained. The Equation (10) is obtained in a similar manner by taking the modulo 2 sum of the Equations (7) and (8). The value of the Equations (9) and (10) is equal to zero when there are no transmission errors since the value of each of the Equations (5) through (8) is equal to zero, and the Equations (9) and (10) are merely linear combinations thereof.

The syndrome bits represented by the Equations (3), (4), (9) and (10) are applied to the majority logic circuit 60. Note that the term $I'_1$ occurs in each of the last mentioned equations. Note further that none of the other terms appears in more than one of the last mentioned equations. Hence, if there is an error in the received information bit $I'_1$, the value of each of the last mentioned four equations will be equal to one, and four ones will be applied to the majority logic 60. Similarly, if any one of the other bits is in error, only the equation in which the erroneous bit occurs will have a value of one, and only a single one will be applied to the majority logic circuit. Hence, the circuit according to the invention can determine whether a particular bit (namely, $I'_1$ in this example) is in error, and operate on the erroneous bit to correct it.

The correction of the erroneous bit is accomplished as follows. The majority logic circuit 60 of FIG. 2 is programmed to apply a one to the modulo 2 adder 66 if the number of ones applied thereto is equal to more than 2. If two or less ones are applied to the majority logic circuit 60, no corrective action is taken. The aforementioned criterion for determining whether corrective action should be taken allows two erroneous bits other than the bit $I'_1$ to have been received without affecting the correction of the bit $I'_1$. If the bit $I'_1$ is in error, four ones are applied to the majority logic circuit 60 which in turn applies a one to the modulo 2 adder 66. The modulo 2 adder 66 combines the one from the majority logic circuit 60 with the incorrect bit $I'_1$ from the stage 36 of shift register 30 to reverse the polarity of the incorrect bit in order to apply a corrected bit to the output point 68.

Since the syndrome bits present in the syndrome register 50 are generated from the information bits applied to the shift register 30, any error in an information bit may result in an error in the syndrome bits generated thereby. Accordingly, each time an erroneous information bit is detected and corrected, a similar correction must be made to the syndrome bits generated from the erroneous information bit. Since, according to Equations (3), (4), (5) and (8) of FIG. 3, the syndrome bits $S_1$, $S_2$, $S_3$ and $S_6$ each contain the erroneous term $I'_1$, the last mentioned syndrome bits are in error and must be corrected. The correction is accomplished by connecting the output of majority logic circuit 60 (FIG. 2) to the stages 51, 54 and 55 of the shift register 50. The one applied to each of the stages 51, 54 and 55 in the event of an error in I, reverses the polarity of the syndrome bits $S_6$, $S_3$ and $S_2$ to provide correct syndrome bits for the correction of subsequent information bits. The erroneous bit $S_1$ present in the stage 56 need not be corrected since it will be shifted out and lost prior to the correction of the next information bit. For this reason, no connection is provided between the majority logic circuit 60 and the last stage 56 of the shift register 50.

Whereas a particular embodiment of the present invention has been illustrated, it should be noted that other embodiments employing the basic concepts described in the foregoing discussion still fall within the scope and spirit of the invention.

I claim:

1. An error correcting system having an encoder for generating parity bits from information bits applied thereto and applying said information bits and said parity bits to utilization means, said encoder including in combination:

sample and storage means having six stages for receiving and storing six successive information bits;

means for generating parity bits connected to said sample and storage means, said parity bit generating means including modulo 2 adder means for generating each parity bit by taking the modulo 2 sum of a predetermined one of said information bits, the two information bits immediately precedent thereto and the information bit five bits precedent to said predetermined information bit to thereby provide a parity bit associated with said predetermined information bit; and switch means for alternately applying said information bits and the parity bits associated therewith to said utilization means.

2. An error correcting system as recited in claim 1 further including a decoder comprising:

means for receiving said information bits and said parity bits;

second sample and storage means having six stages for storing six of said received information bits connected to said receiving means;

means coupled to said receiving means and to said second sample and storage means for generating syndrome bits, said syndrome bit generating means including second modulo 2 adder means for generating each syndrome bit by taking the modulo 2 sum of a predetermined one of said received information bits, the two information bits immediately precedent thereto, the information bit five bits precedent to said predetermined information bit and the parity bit associated with said predetermined information bit to thereby generate a syndrome bit associated with said predetermined information bit;

third sample and storage means having six stages for storing six syndrome bits connected to said syndrome bit generating means;

third modulo 2 adder means connected to said third sample and storage means for providing bits representative of the modulo 2 sum of the syndrome bit associated with said predetermined information bit and the syndrome bit immediately precedent thereto;

fourth modulo 2 adder means connected to said third sample and storage means for providing bits representative of the modulo 2 sum of the two syndrome bits immediately preceding the two syndrome bits applied to said third modulo 2 adder means;

counting means connected to said third sample and storage means and to said third and fourth modulo 2 adder means for taking the sum of the two syndrome bits immediately preceding the two syndrome bits applied to said fourth modulo 2 adder means and the bits provided by said third and fourth modulo 2 adder means, said counting means including means for providing a correction signal when said last mentioned sum exceeds two; and correction means responsive to said correction signal for reversing the polarity of the information bit five bits precedent to said predetermined received information bit in response to said correction signal.

3. An error correcting system as recited in claim 2 wherein said encoder and decoder each includes clock means coupled to each of said sample and storage means for sequentially shifting bits between respective stages thereof.

4. An error correcting system as recited in claim 3 wherein each of said sample and storage means includes a shift register having six stages.

5. An encoder for generating parity bits from information bits applied thereto usable in an error correction system, said encoder comprising:

sample and storage means having six stages including an input stage for serially receiving and storing said information bits, said stages being designated as first through sixth stages starting with said input stage;

means for applying each information bit to said first stage of said sample and storage means for storage therein;

means for sequentially shifting each information bit from said first stage to said second through sixth stages;

a modulo 2 adder having inputs and an output, said inputs being connected to the first, second, third and sixth stages of said sample and storage means;

switch means having two input terminals and an output terminal, one of said input terminals being coupled to the first stage of said sample and storage means and the other terminal being connected to the output of said modulo 2 adder; and means connected to said switch means for causing said switch means to alternately couple said first stage and said output terminal of said modulo 2 adder to said output terminal.

6. An encoder as recited in claim 5 wherein said sample and storage means includes a six stage shift register.

7. A decoder for extracting and correcting information bits from a bit stream including information and parity bits, said decoder comprising:

means for serially receiving said information bits;

means connected to said information bit receiving means for generating syndrome bits, each syndrome bit being generated by taking the modulo 2 sum of a predetermined one of said parity bits, a predetermined one of said received information bits, the two information bits immediately preceding said one of said received information bits and the information bits five bits precedent said predetermined one of said received information bits;

means for serially receiving said syndrome bits connected to said syndrome bit generating means;

first combining means connected to said syndrome bit receiving means for generating bits representative of the modulo 2 sum of a first predetermined pair of adjacent syndrome bits;

second combining means connected to said syndrome bit receiving means for generating bits representative of the modulo 2 sum of a second predetermined pair of adjacent syndrome bits immediately preceding said first predetermined pair of adjacent syndrome bits;

counting means connected to said syndrome bit receiving means and said first and second combining means, said counting means being responsive to a third predetermined pair of adjacent syndrome bits immediately preceding said second predetermined pair of adjacent syndrome bits and the modulo 2 sum representative bits from each of said first and second combining means for generating a correction bit when the sum of said third predetermined pair of adjacent syndrome bits and said modulo 2 sum representative bits exceeds two; and correcting means connected to said information bit receiving means and said counting means for correcting one of said received information bits in response to said correction bit.

8. A decoder as recited in claim 7 wherein said counting means is further coupled to said syndrome bit receiving means and includes means for correcting predetermined ones of said syndrome bits in response to said correction signal.

9. A decoder as recited in claim 8 wherein each of said information bit receiving means and said syndrome bit receiving means includes a six stage shift register having an input stage, said stages being designated as first through sixth stages starting with said input stage, said syndrome bit generating means being connected to the first, second, third and sixth stages of the shift register included in said information bit receiving means, the sixth stage thereof also being connected to said correcting means; said first combining means being connected to the first and second stages of the shift register included in said syndrome bit receiving means, said second combining means being connected to the third and fourth stages thereof, and said counting means being connected to the fifth and sixth stages thereof.

10. A decoder as recited in claim 9 wherein said counting means has syndrome bit correcting output means, said output means being connected to said first, fourth and fifth stages of the shift register included in said syndrome bit receiving means.

11. A decoder for extracting and correcting information bits from a bit stream including information and parity bits, said decoder comprising:

- first sample and storage means having six stages including an input stage for serially receiving and storing said information bits, said stages being designated as first through sixth stages starting with said input stage;
- first modulo 2 adder means coupled to the first, second, third and sixth stages of said first sample and storage means;
- means coupled to said sample and storage means and to said modulo 2 adder means for applying said information bits to said sample and storage means and said parity bits to said modulo 2 adder means, respectively, said first modulo 2 adder means being responsive to said parity bits and the information bits stored in the first, second, third and sixth stages of said first sample and storage means for generating syndrome bits, each syndrome bit representative of the modulo 2 sum of said last mentioned information bits and one of said parity bits;
- second sample and storage means connected to said first modulo 2 adder means for serially receiving and storing said syndrome bits, said second sample and storage means having six stages including an input stage, said stages being designated as first through sixth stages starting with said input stage;
- second modulo 2 adder means coupled to the first and second stages of said second sample and storage means for taking the modulo 2 sum of the contents thereof and providing a signal representative of said sum;
- third modulo 2 adder means coupled to the third and fourth stages of said second sample and storage means for taking the modulo 2 sum of the contents thereof and providing a signal representative of said sum;
- counting means having inputs coupled to said second and third modulo 2 adders and to the fifth and sixth stages of said second sample and storage means for receiving bits therefrom, said counting means being responsive to the sum of the bits applied thereto to provide a correction signal when said sum exceeds two; and
- fourth modulo 2 adder means coupled to the sixth stage of said first sample and storage means and to said counting means, said third modulo 2 adder means being responsive to the modulo 2 sum of the contents of said sixth stage of said first sample and storage means and to said correction signal to provide a corrected information signal.

12. A decoder as recited in claim 11 wherein said counting means has an output coupled to the first, fourth and fifth stages of the second sample and storage means, said second sample and storage means being responsive to said counting means to change the polarity of the bits stored in said first, fourth and fifth stages when the sum of the bits applied to said counting means exceeds two.

13. A decoder as recited in claim 12 further including clock means coupled to said first and second sample and storage means for sequentially shifting said information and syndrome bits from the first through sixth stages of said first and second sample and storage means, respectively.

14. A decoder as recited in claim 13 wherein each of said first and second sample and storage means includes a shift register having six stages designated as first through sixth stages, each stage of each shift register being connected to the correspondingly designated stage of one of said first and second sample and storage means.

* * * * *